(12) United States Patent
Sanford et al.

(10) Patent No.: US 9,223,667 B2
(45) Date of Patent: Dec. 29, 2015

(54) METHOD FOR IDENTIFYING ROOT CAUSE FAILURE IN A MULTI-PARAMETER SELF LEARNING MACHINE APPLICATION MODEL

(71) Applicants: Matthew Barber Sanford, Loveland, CO (US); Ernesto Jorge Wiedenbrug, Fort Collins, CO (US)

(72) Inventors: Matthew Barber Sanford, Loveland, CO (US); Ernesto Jorge Wiedenbrug, Fort Collins, CO (US)

(73) Assignee: AKTIEBOLAGET SKF, Gothenburg (SE)

( * ) Notice: Subject to any disclaimer, the term of this patent is extended or adjusted under 35 U.S.C. 154(b) by 253 days.

(21) Appl. No.: 13/671,842

(22) Filed: Nov. 8, 2012

(65) Prior Publication Data

US 2013/0117607 A1      May 9, 2013

Related U.S. Application Data

(60) Provisional application No. 61/557,562, filed on Nov. 9, 2011.

(51) Int. Cl.
| | |
|---|---|
| G06F 11/00 | (2006.01) |
| G06F 11/25 | (2006.01) |
| G06F 15/18 | (2006.01) |
| G06N 99/00 | (2010.01) |

(52) U.S. Cl.
CPC ............... *G06F 11/25* (2013.01); *G06F 15/18* (2013.01); *G06N 99/005* (2013.01)

(58) Field of Classification Search
CPC .............. G01R 31/3624; G01R 19/10; G01R 19/0007; G01R 19/02; G01R 21/06; G01R 31/08; G06F 11/0796; G06F 11/25; G06F 15/18; G06F 1/206; G06N 7/005; G06N 99/005

USPC ........................................ 714/26, 47.2, 47.3
See application file for complete search history.

(56) References Cited

U.S. PATENT DOCUMENTS

| | | | |
|---|---|---|---|
| 5,726,905 A | 3/1998 | Yazici et al. | |
| 5,742,522 A | 4/1998 | Yazici et al. | |
| 6,014,598 A | 1/2000 | Duyar et al. | |
| 7,567,878 B2 | 7/2009 | Yuan et al. | |
| 7,719,808 B2 * | 5/2010 | Phadke et al. | 361/79 |
| 8,055,928 B2 * | 11/2011 | Bougaev et al. | 713/340 |
| 8,433,743 B2 * | 4/2013 | Kwak et al. | 708/606 |
| 8,494,807 B2 * | 7/2013 | Pecht et al. | 702/179 |
| 2008/0141072 A1 * | 6/2008 | Kalgren et al. | 714/33 |

* cited by examiner

*Primary Examiner* — Bryce Bonzo
*Assistant Examiner* — Elmira Mehrmanesh
(74) *Attorney, Agent, or Firm* — Bryan Peckjian; SKF USA Inc. Patent Dept.

(57) ABSTRACT

A method for identifying root cause failure in a multi-parameter self learning machine application model is presented. At least one multi-function sensor having the capability to measure at least one of a voltage and current of the machine application model is provided. The method includes measuring voltages and currents of a multi-phase load with the multi-function sensors in a passive manor and calculating at least one of a time-varying variable KW, PF, kVAr, or Z out of the measured voltages and currents. The method further provides calculating a first, second or third order derivative of the time-varying variable and classifying segments of at least one of the time-varying variables depending on a state. Then, a step of choosing at least one of the variables and learning their normal behavior is undertaken. Finally, normal behavior is compared to a pattern difference and a root-cause meaning to the pattern difference is identified.

17 Claims, 7 Drawing Sheets

METHOD FOR IDENTIFYING ROOT CAUSE FAILURE IN A MULTI-PARAMETER SELF LEARNING MACHINE APPLICATION MODEL

FIELD OF THE INVENTION

The present disclosure generally relates to a method of monitoring voltages and currents of a machine-driven system to determine if a machine failure is eminent. More particularly, the present disclosure relates to a method of monitoring electrical signals from a machine-driven system as a self-learning diagnostic so that visualized differences can easily be identified and analyzed to determine root cause analysis and early forecasting of incipient failure modes.

BACKGROUND OF THE INVENTION

The present invention provides a method of a multi-parameter self learning machine application model. By monitoring voltages and currents, this method is capable of creating multiple self-learning user controllable multi-parameter models which describe the power condition, load and motor (or any combination thereof).

The invention further provides a self-learning diagnostic technique, whereby electrical signals (voltages and currents) are monitored, combined in various ways and analyzed. The purpose is to visualize differences in patterns of behavior of the machine-driven system (power supply, motor and load); such that problems relating to these three components (or any combination thereof) can be more easily identified and analyzed.

The invention allows root cause analysis and early forecasting of incipient failure modes by moving through a complicated set of interconnected equations to identify the value that is causing the most change in the system. The area of diagnostics is directed to 3 phase electrical machines. Currents and voltages are gathered and then applied to the inventive method. The method utilizes several "signals" and "learns" the "typical" behavior of the system.

SUMMARY OF THE INVENTION

The basic inventive concept provides a method for identifying root cause failure in a multi-parameter self learning machine application model. A first aspect of the present invention provides identifying root cause failure in a multi-parameter self learning machine application model comprising:

providing at least one multi-function sensor having the capability to measure at least one of a voltage and current of the machine application model;

measuring voltages and currents of a multi-phase load with the multi-function sensors in a passive manor:

calculating at least one of a time-varying variable KW, PF, kVAr, or Z out of the measured voltages and currents; and calculating at least one of a first, second or third order derivative of the time-varying variables;

classifying segments of at least one of the time-varying variables depending on a state;

choosing at least one of the calculated time-varying variables and learning their normal behavior;

comparing the normal behavior to a pattern difference; and identifying a root cause meaning to the pattern difference.

In a second aspect of the present invention the multi-function sensor further comprises the capability of measuring vibration.

In a third aspect of the present invention the measured voltages and currents are watched 24 hours a day, 7 days a week by a reading device.

In another aspect of the present invention a data base disposed within the reading device comprises an array to store the data.

In yet another aspect of the present invention an auto refining feature to improve the resolution of the segment width and additionally increasing confidence of an issued alarm by adding a statistical evaluation of a preceding time-window being outside the cases seen defined during the learning phase.

In yet another aspect of the present invention identifying root cause failure in the self learning machine application model is applicable to a generator.

In yet another aspect of the present invention identifying root cause failure in the self learning machine application model takes into consideration condition and behavior of the machine.

In yet another aspect of the present invention identifying root cause failure in the self learning machine application model takes into consideration condition and behavior of a load applied to the machine.

In yet another aspect of the present invention any disturbances straying from usual and healthy mode of operation are identified and may introduce signatures that can be monitored and diagnosed on the voltage and current signals.

In yet another aspect of the present invention measuring the voltages and currents of the multi-phase load in a passive manner includes sensing only existing voltages and currents.

In yet another aspect of the present invention measured voltages and currents are stored and accepted into memory by a computer controlled analog to digital converter.

In yet another aspect of the present invention Min, Max and Median values of the measured voltages and currents are plotted in a candlestick chart format and are used to determine the directions with which the measured values are heading.

In yet another aspect of the present invention both time and frequency domain data is captured and stored.

In yet another aspect of the present invention the stored data is used to compare against a respective boundary of a representative segment to detect an eminent system failure.

In yet another aspect of the present invention the stored data is used to compare against a respective boundary of a representative segment to detect an eminent system failure.

In yet another aspect of the present invention the derivatives of the voltages may include a newly created variable for instantaneous voltage phasor that provides both amplitude and phase.

In yet another aspect of the present invention the derivatives of the currents may include a newly created variable for instantaneous current phasor that provides both amplitude and phase.

In yet another aspect of the present invention the derivatives of the voltages and/or currents may include a newly created variable for instantaneous impedance that provides both amplitude and phase.

In yet another aspect of the present invention the derivatives of the voltages and/or currents may include a newly created variable for frequency that provides a delta angle of instantaneous voltage phasor versus time.

In a final aspect of the present invention the derivatives of the voltages and/or currents may include a newly created variable for frequency that provides a delta angle of instantaneous current phasor versus time.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
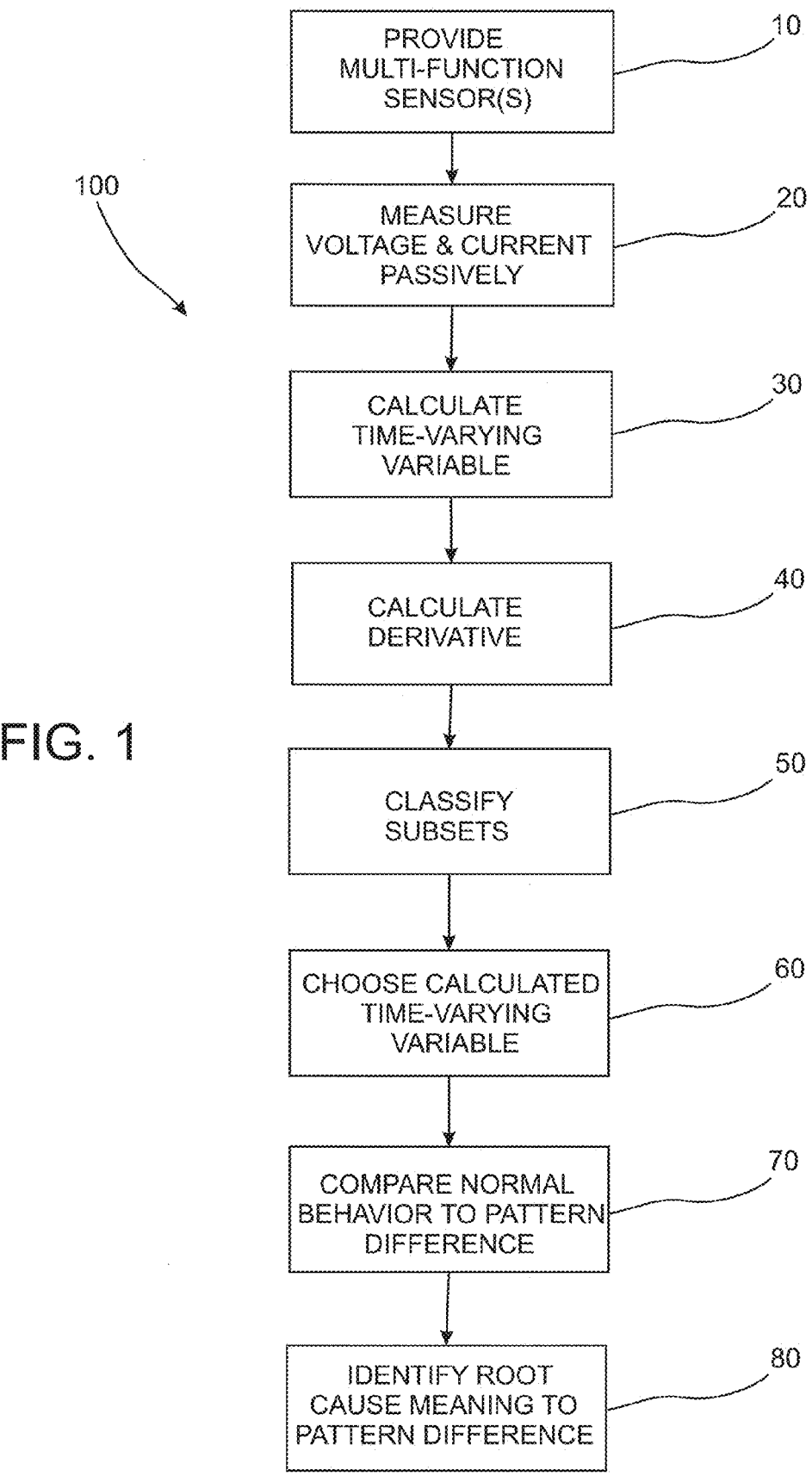
FIG. 1 is a flow chart of a method for identifying root cause failure in a multi-parameter self learning machine application model according to a preferred embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

A method 100 for identifying root cause failure in a multi-parameter self learning machine application model will now be disclosed. The method being used to determine if a machine failure is eminent. An exemplary embodiment of the inventive method 100 is illustrated in the flow diagram depicted in FIG. 1. "Machine," in the context of this disclosure is a term that encompasses both motors and generators. In its basic form, a motor is an electrical machine that takes electrical power and converts it into mechanical power. The flow of energy is opposite for generators. With a generator, the power is fed into the shaft and comes out of the electrical terminals. Consequently, the method of the present invention is applicable to both motors and generators.

In the present invention, "Machine application model" means the whole system. That is, the quality of the electrical power supplied to the machine, the condition and behavior of the machine itself, as well as the condition and behavior of the load itself. The electrical measurements of currents and voltages monitor the flow of energy going through the system; coming from the power supply going through the machine and going to the load. This means that any disturbance straying from usual and healthy mode of operation has a chance to introduce signatures that can be monitored and diagnosed on the current and voltage signals. A self-learning method is based upon development of some kind of a "model," and finding differences between the current behavior of the machine application and said learned model.

At least one multi-function sensor having the capability to measure at least one of a voltage and current of the machine application model is provided in method step 10. In reality, the sensors only sense a single parameter. However, the use of the language "multi-function" opens up the possibilities to using other types of sensors, aside from voltage and current, such as, vibration or infrared. In one arrangement, current and voltage signals are gathered. Typically, 3 current and 3 voltage signals are gathered. However this method could be used with any other combination of signals. That is, with as few signals as one current and one voltage, or 2 currents worth of gathered data.

Method 100 further provides step 20 that includes measuring voltages and currents of a multi-phase load with the multi-function sensors in a passive manor. The language "passive manor," in the context of the present invention, means that only existing currents and voltages are sensed. That is, the signals are watched but nothing is actively reacted to like shutting down a motor if fault data is obtained. The measured voltages and currents are typically monitored 24 hours a day, 7 days a week during a test stage in order to obtain the data to be learned.

The measured voltages and currents are typically stored in a data base that can be used to provide a structured learned curve. A computer controller Analog to Digital Converter (ADC) with memory suitably acts as a reading device that accepts and stores the measured voltages and current. Min, max and median values are typically plotted in a candle stick chart format so that a user can see the directions with which the values are moving. Both time domain and frequency information is captured. This test data will later be used to compare against a respective boundary of a respective segment to detect an eminent motor or generator failure. The measured data is stored in a large array disposed within the reading device.

Method 100 also provides step 30 which entails calculating at least one of a time-varying variable KW, PF, kVAr, or Z out of the measured voltages and currents. See Table I listed below. In the electrical world, currents and voltages may be interrelated to one another in order to obtain results that have physical meaning. Any one of the above referenced time-varying variables may be calculated from the measured voltages and currents. As such, there is a potential for a number of multiple embodiments of the present invention based on which time-varying variable is selected to be calculated.

TABLE I

| Name | Variable | Common unit | SI |
|---|---|---|---|
| Real power (or active power) | P | kW | Watt |
| Reactive power (or imaginary power) | Q | kVAr | Volt Ampere |
| Apparent power (or complex power) | S | kVA | Volt Ampere |
| Power Factor | PF | % | Unit-less |
| Impedance | Z | Ohm | Ohm |
| Frequency | f | Hz | Hertz |
| Phase angle | Phi | deg | Rad |

The method 100 includes step 40 which also entails calculating at least one of a first, second or third order time derivative of one of the time-varying variables and using these as new variables. Here, the pace with which the supply-motor-load system travels from one state to a different state is illustrated. The derivatives of the voltages and/or currents may include one or more newly created variables from the following list:
instantaneous voltage phasor→amplitude and phase,
instantaneous current phasor→amplitude and phase,
instantaneous impedance→amplitude and phase,
frequency:
a. delta angle of instantaneous voltage phasor vs. time; or
b. delta angle of instantaneous current phasor vs. time.

Method 100 also includes step 50 where segments of at least one of the time-varying variables are classified, depending on a state. A segment is a discrete digitization of the data into groups. A one-class classifier is employed that trains without having negative data. This is because, it is either not available, hard to collect, or predictions are required for new classes that haven't been seen during the training process. Based on the data obtained, two answers for classification are possible: "Target" and "Unknown." Depending on a state corresponds to depending on the values of some of the variables.

To make the inventive method clear, imagine a black box that performs an unknown mathematical operation. One can monitor the input to the black box (the input represents the voltage) and one can also monitor the output (the current). Because the black box is an analog machine the same results are not necessarily obtained with the same input. So, the data is broken into discrete steps to model the internal transform function that is occurring inside the black box.

For example, if the value of 5 is repeatedly put into the black box, and the black box always returns a value between (9.90 and 10.10) with enough samples, one can determine with a calculable measure of accuracy that the transfer function is to multiply by 2 (this is done during the training period). One can further calculate that 80% of the data lies between 9.96 and 10.04. Armed with this information one can monitor the input and the output of the data for deviations from the transfer function. If during the analysis portion if we see an input value of 5 and a result of 12, it can be identified that this data does not belong with our machine model, and therefore something within the "black box" has changed or is wrong.

Figure 2:
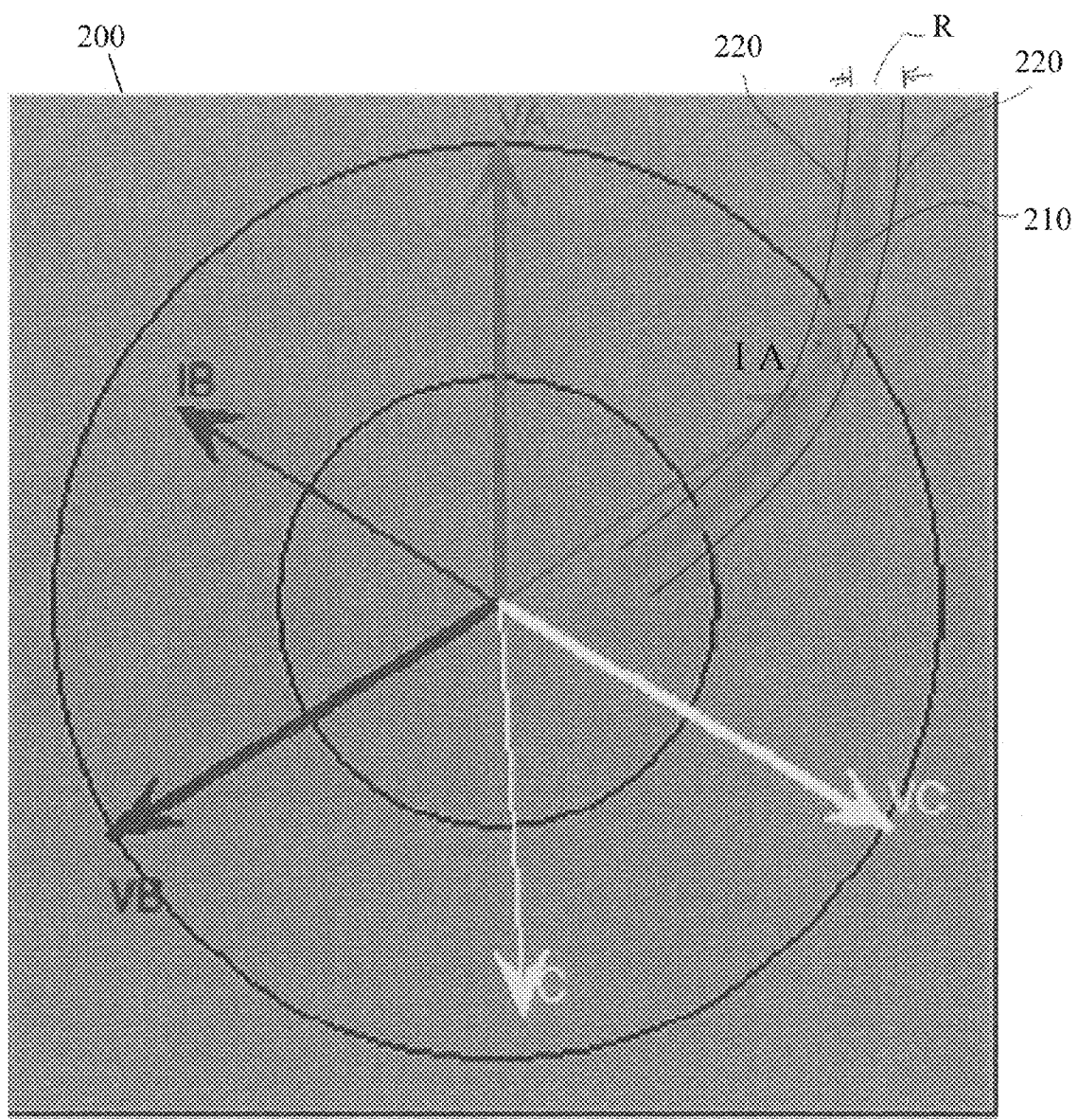
FIG. 2 is a polar plot of voltage level versus real power according to a preferred embodiment of the present invention.

In the analogy, the "machine" as defined in this disclosure is the black box. In general, the operating point of the machine is well defined by its input voltage, internal resistances (coils, etc), and load characteristics. As the load changes the machine will follow a predefined path on an operating curve 210 on the polar plot 200 of voltage level versus real power as shown in FIG. 2. As the load of the machine increases the amount of real power required by the machine also increases (real power is represented by the Y axis, this is known as KVAR). The method 100 provides learning the phasor curve by breaking the data into discrete steps in order to re-create the phasor curve shown in FIG. 2. Each step of the curve is put into its own equation and the sum of the equations result in the entire curve.

After the curve has been learned, one can then monitor new data to determine if the machine is still operating on this curve. One of the main inventive aspects of the present invention is the additional step of calculating and learning the corresponding $1^{st}$, $2^{nd}$ and $3^{rd}$ order derivatives (d/dt), $(d/dt)^2$ and $(d/dt)^3$ respectively. Taking the derivative(s) is the equivalent to monitoring how fast the data can move on the curve and with how much momentum. The additional criterion provides new aspects with which one can analyze and process the data in order to plot the resulting operating curve. Depending on the level of confidence required, a region R around the curve 210 and its derivative(s) would be identified by lines 220 (2 standard deviations) to be used for alarming.

The following example, by way of analogy, will explain the benefit of calculating "derivatives" of the time-varying variable. Imagine that a data file that has a record of several months' worth of data containing direction and strength that wind was blowing for any instant in time. The question is whether any whirlwind passed by the measurement station. This question may represent a failure in a multi-parameter self learning machine application model.
Options:
i) Look "by hand": have a person look at the time-waveforms (a person could see that the wind "spun", starting from N, and changing to NW, W, SW, S, SE, E, NE, N, etc.
ii) Disadvantage:
Months of data would take extremely long to analyze "by hand"
iii) Write an algorithm that looks for the pattern: N, NW, W, . . . ; and one for the clockwise direction.
iv) Disadvantages:
The wind could change directions extremely slowly and by chance "spin" around, yet it wouldn't be a whirlwind.
The sensor would point at a direction of wind, even if the wind is at near standstill. A ladybug flying circles around the sensor would give a false positive "whirlwind".

Figure 3:
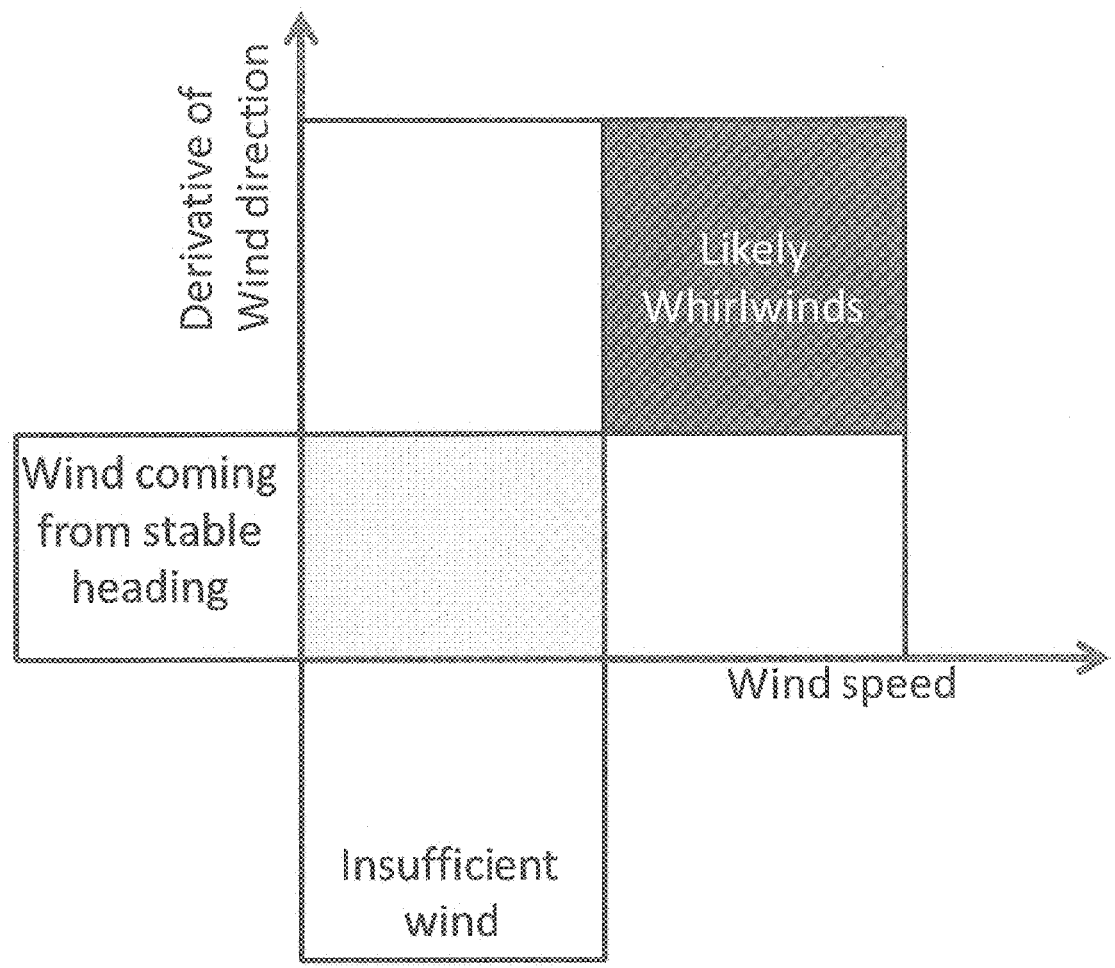
FIG. 3 is a plot of derivative of wind-direction against amount of wind according to a preferred embodiment of the present invention

Solution: Make the derivative of the direction where the wind blows the rate of change of direction and look for the times where the wind direction keeps changing rapidly. See the layout shown in FIG. 3. Ensure that there is enough wind. Method: Plot derivative of wind-direction against amount of wind. The only area of interest is the subset that has sufficient wind, showing a high derivative.

The inventive method may also include auto refining of the segment width. This relates to improving the resolution of the segment width and additionally increasing confidence of an issued alarm by adding a statistical evaluation of the preceding time-window being outside the cases seen defined during the learning phase. That is, 90% of the last X samples outside of the learning phase's alarms.

A step 60 of choosing at least one of the calculated time-varying variables and learning their normal behavior is then provided in method 100. As previously discussed, the segments behavior is learned and then compared to their original normal patterns. The method 100 also includes the step 70 of comparing the normal behavior to a pattern difference. As previously discussed, In another embodiment, method 100 may be used in conjunction with load dependent frequency domain variables. Here, a combination of the preceding data points looked at, are chosen in accordance to other criteria than time domain. That is, data points within a segment of a variable, regardless of when that data was taken in time.

Finally, method 100 also includes the step 80 of identifying a root cause meaning to the pattern difference. Using this method, one can identify time-domain and frequency domain variables that can be used as a predictive measure for a specific fault. This would be based on a rule system that would identify a change in the output with the relative change of other outputs to determine a root cause. For instance if one calculated the Harmonic content relative to a KW input and the relative amplitudes began to change, this would likely be predictive of a change in the characteristics of the windings.

The following two examples are illustrative of the results that can be obtained by following inventive method 100.

Example One

This method has been used to provide a suitable algorithm to diagnose the troubled behavior of some wind generators in a wind generator park. Days of measurements (measuring voltages and currents) were taken. Monster-sized files of data (time-wave-forms) were obtained. One wind generator was "known good", and the other "known bad". "Known good" meant that the wind generator almost never showed a problem, whereas "known bad" meant that the problem showed "very few times", unpredictably. It was not specifically known what was wrong with the wind generators. However, it was known in advance that the problems were electrical by nature.

Figure 4:
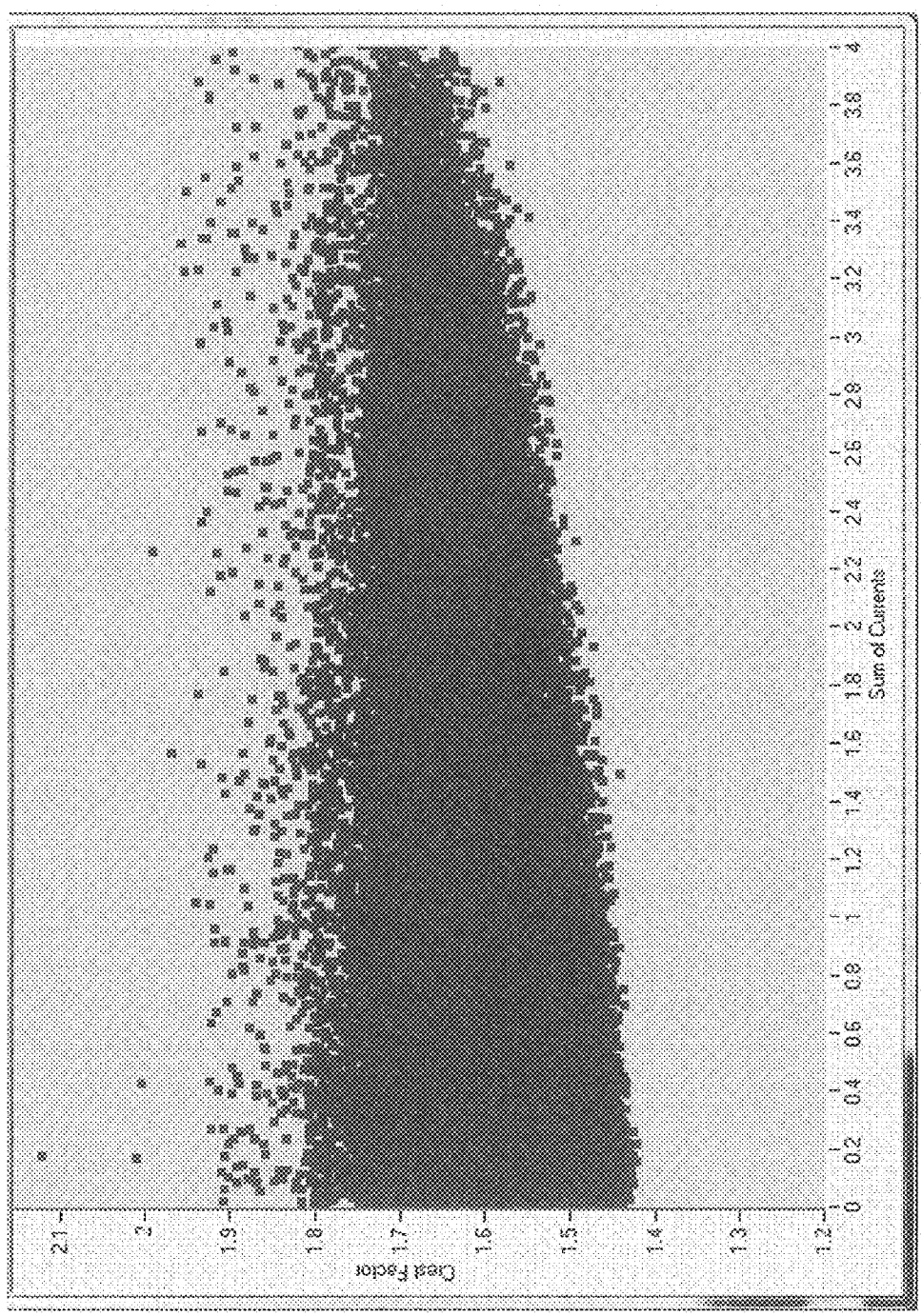
FIG. 4 is a scatter plot of data showing a sum of currents versus crest factor in connection with a wind generator having problems more frequently.
Figure 5:
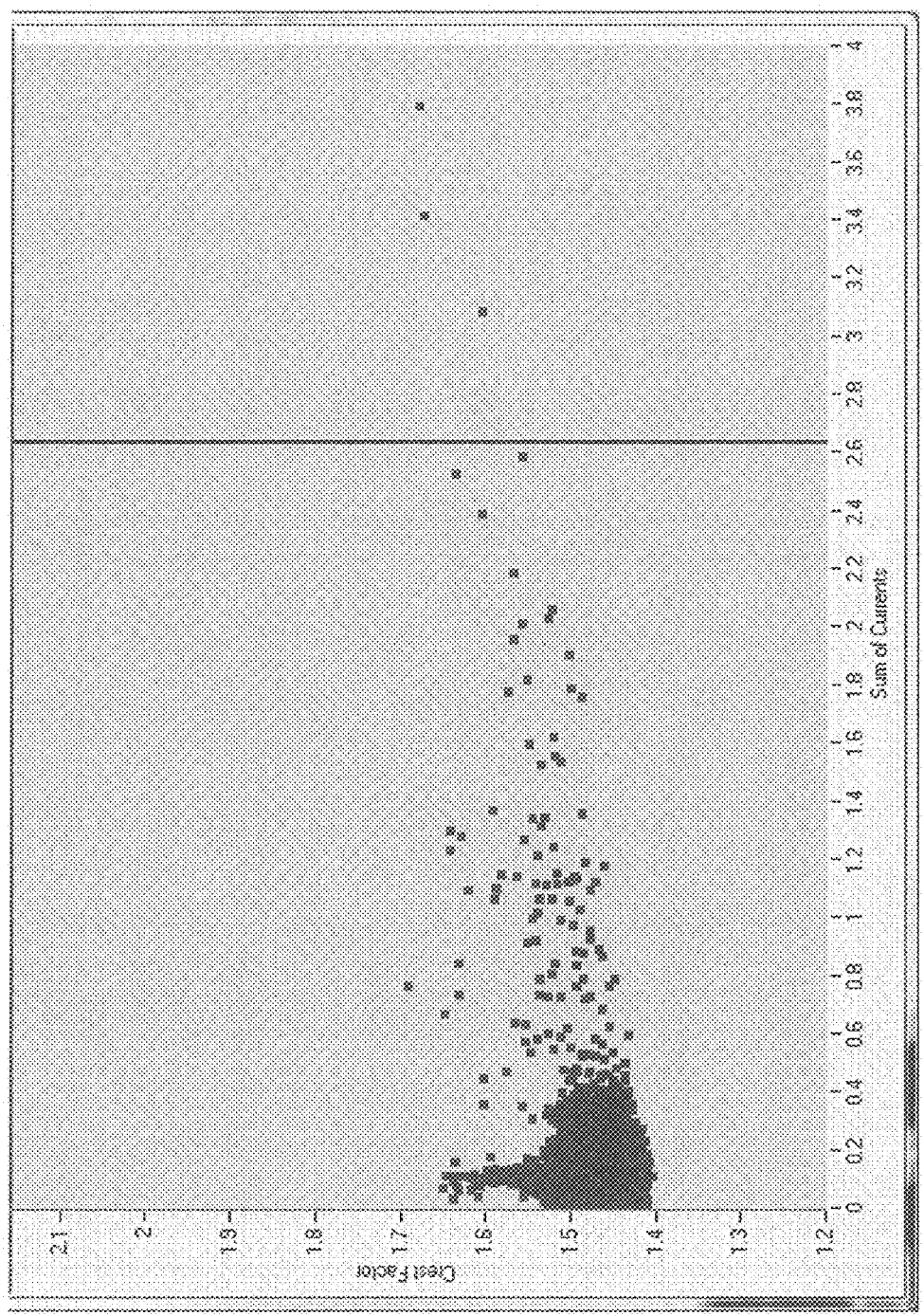
FIG. 5 is a scatter plot of data showing a sum of currents versus crest factor in connection with a wind generator that had problems very rarely.

The inventive method was able to identify the electrical problem. Compare the scatter plots illustrated in FIGS. 4 and 5. FIG. 4 illustrates a plot that had problems "more frequently" while FIG. 5 illustrates a plot that had the problems "very rarely."

The axes are represented as follows:

The x-axis is the "sum of currents": $I_{sum}=abs(I_a+I_b+I_c)$ The healthy operation of a wind generator should have $I_{sum}=0$ at all times.

The y-axis is the "crest factor"=$I_{Peak}/I_{RMS}$. Theoretically, crest factor should be roughly above 1.4 but one would expect that a range between 1.35 and 1.5 is acceptable.

Both FIGS. 4 and 5 show roughly the same amount of data in the scatter plots. The "healthy" generator's (or motor) data rarely exceeds 1.5 crest factor and almost never exceeds 0.5 in sum of currents. One glimpse of the respective plots and we have the answer that the second generator is bad.

Example Two

Figure 6:
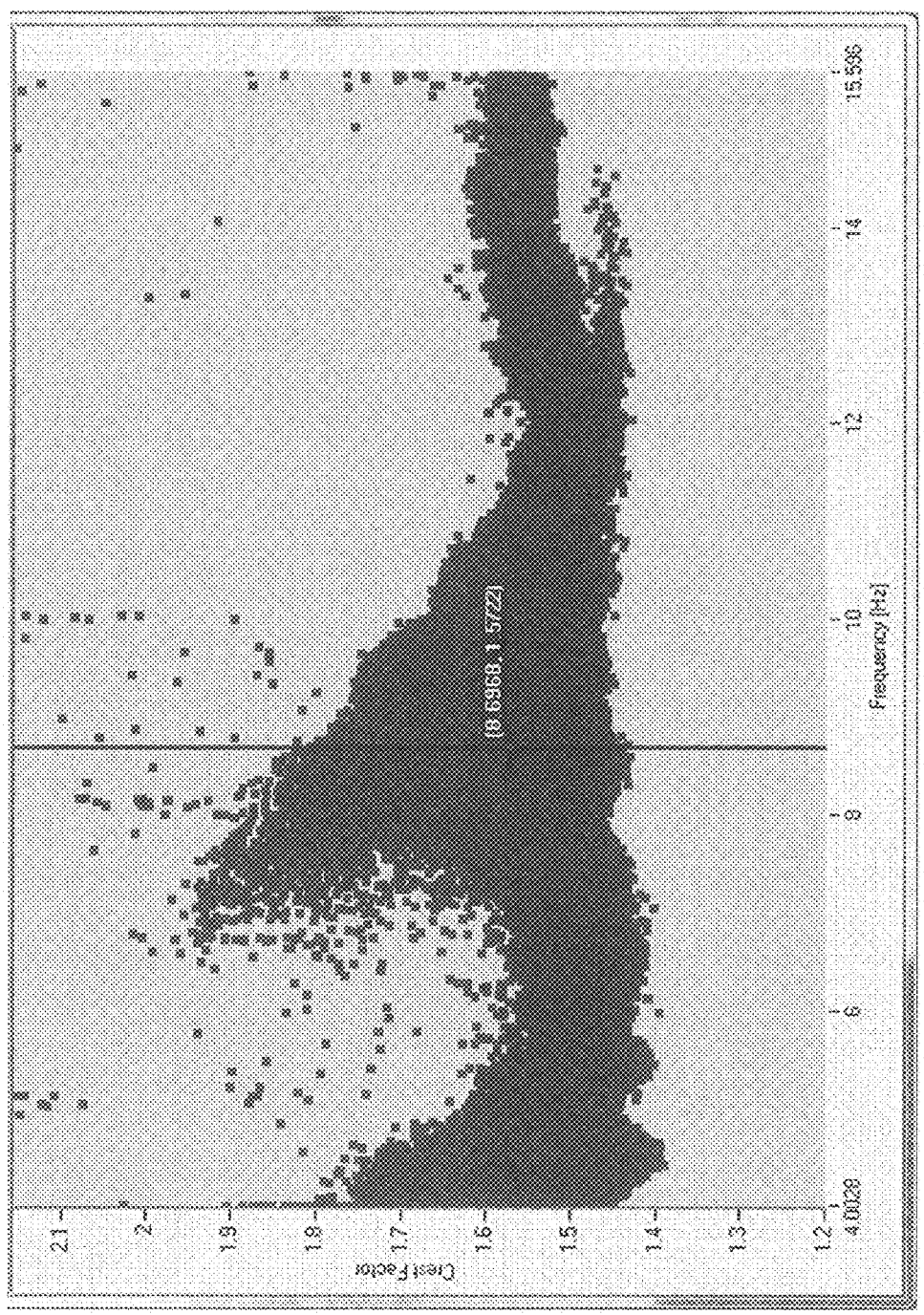
FIG. 6 is a scatter plot of data showing crest factor vs. frequency in connection with a wind generator that had problems more frequently.
Figure 7:
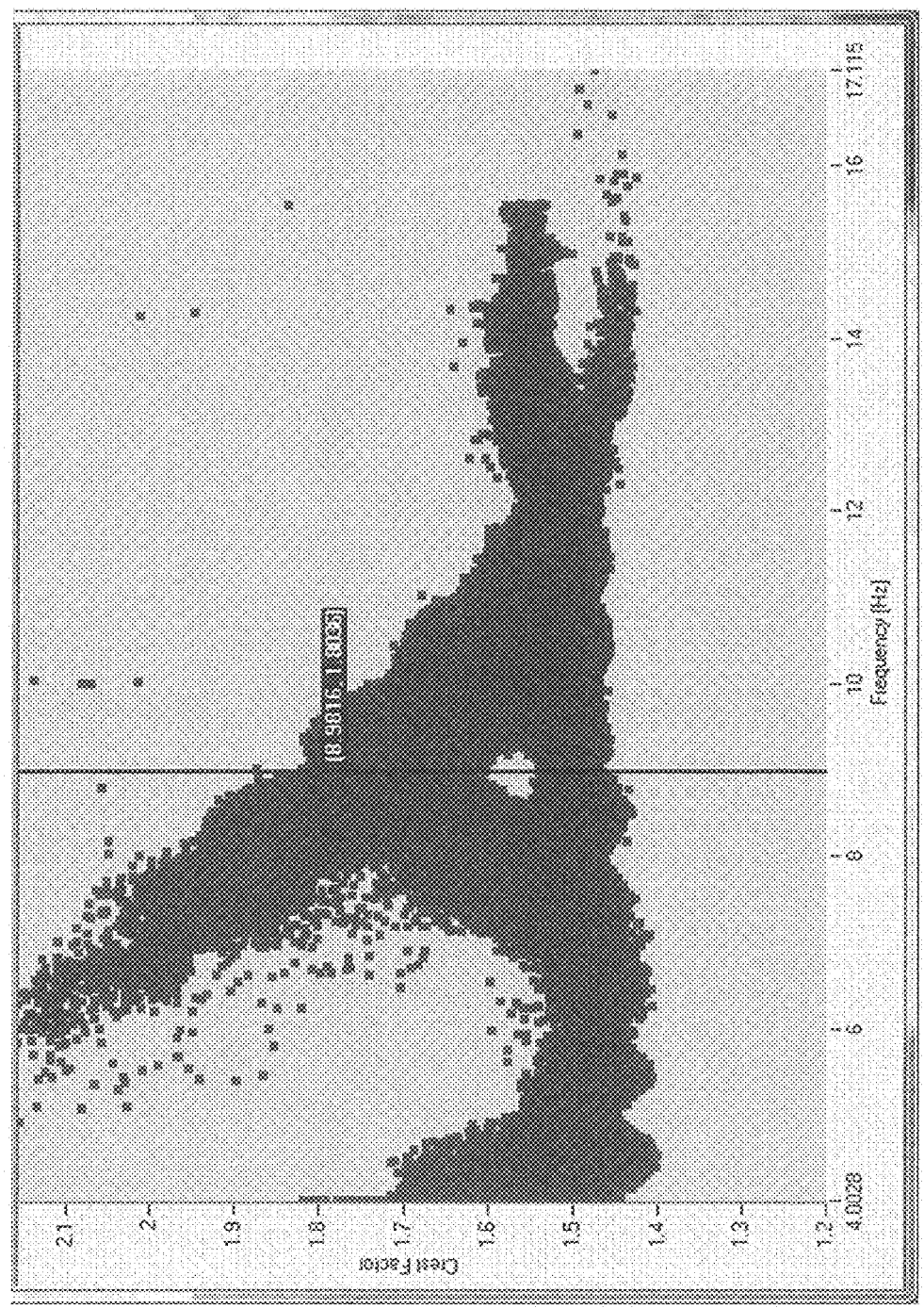
FIG. 7 is a scatter plot of data showing crest factor vs. frequency in connection with a wind generator that had problems less frequently.

Plotting crest factor vs. frequency. See FIGS. 6 and 7. There are clear differences that show for both generators. Crest factor is calculated from the geometry of the waveform. Many different variables could have been calculated, to deliver a similar quality of diagnosis. In this case, "Frequency" has a very different "value" as in the mechanical world: we mean the fundamental frequency at which the generator is supplied by the variable frequency drive. In this case it is similar to "RPM" for the mechanical world. The plots illustrated in FIGS. 6 and 7 can be interpreted like the "behavior" of the generator. From them, we can simply see that the operation of the generator of FIG. 6 is bad.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. A method for identifying root cause failure in a multi-parameter self learning machine application model comprising:
providing at least one multi-function sensor having the capability to measure at least one of a voltage and current of the machine application model;
measuring voltages and currents of a multi-phase load with the multi-function sensors in a passive manner which includes sensing existing voltages and currents;
storing and accepting the measured voltages and currents into memory by a computer controlled analog to digital converter;
calculating at least one of a time-varying variable KW, PF, kVAr, or Z out of the measured voltages and currents;
calculating at least one of a first, second or third order derivative of the at least one time-varying variable;
classifying segments of at least one of the time-varying variables depending on a state;
choosing at least one of the calculated time-varying variables and learning their normal behavior;
comparing the normal behavior to a pattern difference;
identifying a root cause meaning to the pattern difference;
plotting Min, Max and Median values of the measured voltages and currents in a candlestick chart format; and
determining the directions with which the measured voltages and currents are heading using the Min, Max and Median values.

2. The method of claim 1, wherein the multi-function sensor further comprises the capability of measuring vibration.

3. The method of claim 1, wherein the measured voltages and currents are watched 24 hours a day, 7 days a week by a reading device.

4. The method of claim 2, wherein a data base disposed on the reading device comprises an array to store the data.

5. The method of claim 1, further comprising an auto refining feature to improve the resolution of a segment width and increasing confidence of an issued alarm by adding a statistical evaluation of a preceding time-window being outside the cases seen defined during the learning phase.

6. The method of claim 1, wherein the method of identifying root cause failure in the self learning machine application model is applicable to a motor.

7. The method of claim 1, wherein the method of identifying root cause failure in the self learning machine application model is applicable to a generator.

8. The method of claim 1, wherein the method of identifying root cause failure in the self learning machine application model takes into consideration condition and behavior of the machine.

9. The method of claim 1, wherein the method of identifying root cause failure in the self learning machine application model takes into consideration condition and behavior of a load applied to the machine.

10. The method of claim 1, wherein any disturbances straying from usual and healthy mode of operation are identified and may introduce signatures that can be monitored and diagnosed on the voltage and current signals.

11. The method of claim 1, wherein measuring the voltages and currents of the multi-phase load in a passive manner includes sensing only existing voltages and currents.

12. The method of claim 1, wherein both time and frequency domain data is captured and stored.

13. The method of claim 12, wherein the stored data is used to compare against a respective boundary of a representative segment to detect an eminent system failure.

14. A method for identifying root cause failure in a multi-parameter self learning machine application model comprising:
provided at least one multi-function sensor having the capability to measure at least one of a voltage and current of the machine application model;
measuring voltages and currents of a multi-phase load with the multi-function sensors in a passive manner;
calculating at least one of a time-varying variable KW, PF, kVAr, or Z out of the measured voltages and currents;
calculating at least one of a first, second or third order derivative of the at least one time-varying variable;
classifying segments of at least one of the time-varying variables depending on a state;
choosing at least one of the calculated time-varying variables and learning their normal behavior;
comparing the normal behavior to a pattern difference; and
identifying a root cause meaning to the pattern difference,
wherein the derivatives of the voltages include a newly created variable for instantaneous voltage phasor that provides both amplitude and phase.

15. A method for identifying root cause failure in a multi-parameter self learning machine application model comprising:
providing at least one multi-function sensor having the capability to measure at least one of a voltage and current of the machine application model;
measuring voltages and currents of a multi-phase load with the multi-function sensors in a passive manner;
calculating at least one of a time-varying variable KW, PF, kVAr, or Z out of the measured voltages and currents;
calculating at least one of a first, second or third order derivative of the at least one time-varying variable;
classifying segments of at least one of the time-varying variables depending on a state;
choosing at least one of the calculated time-varying variables and learning their normal behavior;
comparing the normal behavior to a pattern difference; and
identifying a root cause meaning to the pattern difference,
wherein the derivatives of the currents include a newly created variable for instantaneous current phasor that provides both amplitude and phase.

16. A method for identifying root cause failure in a multi-parameter self learning machine application model comprising:
providing at least one multi-function sensor having the capability to measure at least one of a voltage and current of the machine application model;
measuring voltages and currents of a multi-phase load with the multi-function sensors in a passive manner;
calculating at least one of a time-varying variable KW, PF, kVAr, or Z out of the measured voltages and currents;
calculating at least one of a first, second or third order derivative of the at least one time-varying variable;
classifying segments of at least one of the time-varying variables depending on a state;
choosing at least one of the calculated time-varying variables and learning their normal behavior;
comparing the normal behavior to a pattern difference; and
identifying a root cause meaning to the pattern difference,
wherein the derivatives of the voltages and/or currents include a newly created variable for instantaneous impedance that provides both amplitude and phase.

17. A method for identifying root cause failure in a multi-parameter self learning machine application model comprising:
providing at least one multi-function sensor having the capability to measure at least one of a voltage and current of the machine application model;
measuring voltages and currents of a multi-phase load with the multi-function sensors in a passive manner;
calculating at least one of a time-varying variable KW, PF, kVAr, or Z out of the measured voltages and currents;
calculating at least one of a first, second or third order derivative of the at least one time-varying variable;
classifying segments of at least one of the time-varying variables depending on a state;
choosing at least one of the calculated time-varying variables and learning their normal behavior;
comparing the normal behavior to a pattern difference; and
identifying a root cause meaning to the pattern difference,
wherein the derivatives of the voltages and/or currents include a newly created variable for frequency that provides a delta angle of instantaneous voltage phasor or current phasor versus time.

* * * * *